US 012109796B2

United States Patent
Gross et al.

(10) Patent No.: US 12,109,796 B2
(45) Date of Patent: Oct. 8, 2024

(54) SENSOR APPLIQUE WITH ULTRA VIOLET CURABLE PRESSURE SENSITIVE ADHESIVE

(71) Applicant: GM GLOBAL TECHNOLOGY OPERATIONS LLC, Detroit, MI (US)

(72) Inventors: Adam F. Gross, Santa Monica, CA (US); Berryinne Decker, Macedonia, OH (US); Mike Hilston, Painesville, OH (US); Adam L. Wright, Livonia, MI (US); Anthony L. Smith, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 178 days.

(21) Appl. No.: 17/750,843

(22) Filed: May 23, 2022

(65) Prior Publication Data
US 2022/0281207 A1    Sep. 8, 2022

Related U.S. Application Data

(62) Division of application No. 16/419,542, filed on May 22, 2019, now abandoned.

(51) Int. Cl.
*B32B 7/12* (2006.01)
*B32B 7/06* (2019.01)
*B32B 27/08* (2006.01)
*B32B 27/32* (2006.01)
*B32B 37/12* (2006.01)
*B32B 38/00* (2006.01)
*G01S 7/481* (2006.01)

(52) U.S. Cl.
CPC .................. *B32B 7/12* (2013.01); *B32B 7/06* (2013.01); *B32B 27/08* (2013.01); *B32B 27/322* (2013.01); *B32B 37/12* (2013.01); *B32B 38/0008* (2013.01); *G01S 7/4811* (2013.01); *B32B 2037/1253* (2013.01); *B32B 2255/10* (2013.01); *B32B 2307/412* (2013.01)

(58) Field of Classification Search
CPC .. B32B 7/12; B32B 7/06; B32B 27/08; B32B 27/322; B32B 2255/10; B32B 2307/412
See application file for complete search history.

(56) References Cited

U.S. PATENT DOCUMENTS

| | | |
|---|---|---|
| 6,878,440 B1 | 4/2005 | Yamanaka et al. |
| 9,840,107 B2 | 12/2017 | Rudelman et al. |
| 10,125,227 B2 | 11/2018 | Gross et al. |

(Continued)

OTHER PUBLICATIONS

Sham, Man Lung, et al. "Cleaning and functionalization of polymer surfaces and nanoscale carbon fillers by UV/ozone treatment: a review." Journal of composite materials 43.14 (2009): 1537-1564. (Year: 2009).*

(Continued)

*Primary Examiner* — Michael Zhang

(57) ABSTRACT

An applique for covering a clear substrate through which light is at least one of transmitted and received includes: a transparent sheet having: a first surface; and a second surface that is opposite the first surface; and a ultraviolet (UV) curable pressure sensitive adhesive that is disposed on the first surface of the transparent sheet, that is curable using UV light, and that is configured to adhere the transparent sheet to a third surface of the clear substrate.

18 Claims, 5 Drawing Sheets

(56) References Cited

U.S. PATENT DOCUMENTS

| | | | |
|---|---|---|---|
| 10,259,971 B2 | 4/2019 | Nowak et al. | |
| 10,570,292 B1 | 2/2020 | Rodriguez et al. | |
| 2004/0091713 A1 | 5/2004 | Suwa et al. | |
| 2004/0121105 A1* | 6/2004 | Janssen | B32B 7/06 428/40.1 |
| 2010/0065212 A1* | 3/2010 | Husemann | H01L 31/048 156/332 |
| 2011/0147773 A1 | 6/2011 | Kostka | |
| 2014/0246090 A1 | 9/2014 | Weigel et al. | |
| 2015/0166841 A1 | 6/2015 | Ueda et al. | |
| 2015/0359675 A1* | 12/2015 | Wilson | B32B 27/365 2/431 |
| 2016/0201005 A1 | 7/2016 | Nowak et al. | |
| 2017/0015922 A1 | 1/2017 | Gross et al. | |
| 2017/0155006 A1* | 6/2017 | Weigel | H01L 31/0481 |
| 2017/0298286 A1 | 10/2017 | Nowak et al. | |
| 2018/0003803 A1* | 1/2018 | Kakani | G02B 13/22 |
| 2018/0037746 A1 | 2/2018 | Nelson et al. | |
| 2018/0208795 A1 | 7/2018 | Dustin et al. | |
| 2019/0302316 A1 | 10/2019 | Gross et al. | |
| 2020/0073019 A1* | 3/2020 | Hart | B29C 63/42 |
| 2020/0109294 A1 | 4/2020 | Rodriguez et al. | |
| 2020/0369002 A1 | 11/2020 | Gross et al. | |
| 2020/0371211 A1* | 11/2020 | Sartenaer | C03C 3/087 |
| 2021/0070008 A1* | 3/2021 | Nietfeld | G02B 1/18 |

OTHER PUBLICATIONS

Wikipedia.com "Glass coloring and colcor marking"; Mar. 28, 2019; https://en.wikipedia.org/wiki/Glass_coloring_and_color_marking<https://protect-us.mimecast.com/s/60_qCOYEMLhpoQLvHvxmpS>.

"3M™ Contrast Enhancement Film CEF28XX (8148-X) Series"; 3M Company—3M Display Materials & Systems Division, St. Paul, M,, Technical Data. 2016.

Gross, Adam F., Andrew P. Nowak, Elena Sherman, Christopher Ro, Sophia S. Yang, Maryam Behroozi and April Rodriguez. "Construction of an Insect Impact Testing System and Data from Low Adhesion Polymer Coatings". HRL Laboratories, LLC. 3011 Malibu Canyon Rd, Malibu, CA 90265, USA, afgross@hrl.com; 3 pages.

Gross, Adam F., Andrew P. Nowak, Elena Sherman, Christopher Ro, Sophia S. Yang, Maryam Behroozi, and April R. Rodriguez. "Insect Abatement on Lubricious, Low Adhesion Polymer Coatings Measured with an Insect Impact Testing System". HRL Laboratories, LLC, Malibu, CA USA. Adv Polym Sci. DOI: 10.1007/12_2017_35. Springer International Publishing AG 2017; 17 pages.

Sham, Man Lung, et al. "Cleaning and functionalization of polymer surfaces and nanoscale carbon filters by UV/ozone treatment: a review." Journal of composite materials 43.14 (2009): 1537-1564. (Year: 2009).

\* cited by examiner

SENSOR APPLIQUE WITH ULTRA VIOLET CURABLE PRESSURE SENSITIVE ADHESIVE

CROSS-REFERENCE TO RELATED APPLICATIONS

The present disclosure is a divisional of and claims the benefit of U.S. patent application Ser. No. 16/419,542, filed on May 22, 2019. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to sensors with lenses or windows and more particularly to appliques for covering lenses of sensors.

Light emitting and/or receiving sensors may be exposed to harsh environmental conditions. For example, a vehicle may include one or more light emitting and receiving sensors, such as, cameras, light detection and ranging (LIDAR) sensors, rangefinders, and other types of sensors. The light emitting and receiving sensors are positioned on the exterior of the vehicle and exposed to the environment.

Light emitting and/or receiving sensors include a lens and/or a window through which light rays are transmitted and received. The exterior surface of the lens or window may be coated to protect the lens from scratches. The exterior surface of the lens or window may be cleaned, for example, via air or washer fluid, to remove dirt and debris. The presence of dirt and/or debris on the exterior surface of the lens or window may decrease light transmission through the lens or window and may decrease performance of the sensor.

SUMMARY

In a feature, an applique for covering a clear substrate through which light is at least one of transmitted and received includes: a transparent sheet having: a first surface; and a second surface that is opposite the first surface; and a ultraviolet (UV) curable pressure sensitive adhesive that is disposed on the first surface of the transparent sheet, that is curable using UV light, and that is configured to adhere the transparent sheet to a third surface of the clear substrate.

In further features, the UV curable pressure sensitive adhesive includes adhesive 8148 by 3M corporation.

In further features, a thickness of the UV curable pressure sensitive adhesive is 2 mils.

In further features, the transparent sheet is a fluoropolymer sheet.

In further features, the transparent sheet is fluorinated ethylene propylene.

In further features, the UV curable pressure sensitive adhesive is a dry adhesive.

In further features, the UV curable pressure sensitive adhesive includes a sheet of UV curable adhesive that is cured using the UV light after application of the applique to the clear substrate.

In further features, prior to application of the UV curable pressure sensitive adhesive to the transparent sheet, the first surface of the transparent sheet is treated by at least one of an ozone treatment process, a corona treating process, a chemical etching process, and a plasma treating process.

In further features, the UV curable pressure sensitive adhesive is configured to adhere better to the first surface of the transparent sheet than to the third surface of the clear substrate.

In further features: the clear substrate exhibits a first index of refraction; the UV curable pressure sensitive adhesive exhibits a second index of refraction after being UV cured; the transparent sheet exhibits a third index of refraction; the third index of refraction of the transparent sheet is less than the second index of refraction; and the second index of refraction is less than the first index of refraction of the clear substrate.

In further features, the third surface of the clear substrate is a planar surface.

In further features, the third surface of the clear substrate is a convex surface.

In further features, a release liner covers the UV curable pressure sensitive adhesive.

In further features, the UV curable pressure sensitive adhesive is configured to adhere better to the first surface of the transparent sheet than to the release liner.

In further features, a coating on the second surface of the transparent sheet.

In further features, the coating includes at least one of: an anti-icing coating; an anti fouling coating; an anti-scratch coating; an anti-reflective coating; a tint; a reflective coating; and a hydrophilic coating.

In a feature, a sensor includes: a clear substrate having a first surface; a sensor module configured to receive light through the clear substrate; and an applique that is adhered to the first surface of the clear substrate and that includes: a transparent sheet having: a second surface; and a third surface that is opposite the second surface; and a ultraviolet (UV) cured pressure sensitive adhesive that is sandwiched between the second surface of the transparent sheet and the first surface of the clear substrate and that adheres the transparent sheet to the clear substrate.

In further features, the sensor module is further configured to transmit light through the clear substrate.

In further features: the transparent sheet is fluorinated ethylene propylene; and the UV cured pressure sensitive adhesive is adhesive 8148 by 3M corporation that is cured using UV light.

In further features, the applique further includes, on the third surface of the transparent sheet, at least one of: an anti-icing coating; an anti fouling coating; an anti-scratch coating; an anti-reflective coating; a tint; a reflective coating; and a hydrophilic coating.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Sensors, such as light detection and ranging (LIDAR) sensors transmit and receive light through a clear substrate, such as a polycarbonate lens. Sensors can be exposed to harsh environmental conditions, such as the environment around a vehicle.

According to the present disclosure, an anti-fouling applique is applied to the clear substrate of a sensor, such as a LIDAR sensor. The anti-fouling applique includes a pressure sensitive adhesive and a transparent sheet. The pressure sensitive adhesive adheres the transparent sheet to the clear substrate of the sensor. The pressure sensitive adhesive is cured via ultraviolet light after the applique is applied to the clear substrate of the sensor. As an example, the pressure sensitive adhesive may include UV curable adhesive 8148 by 3M or another suitable UV curable adhesive. A UV cured adhesive may provide better light transmission characteristics over time than non-UV cured adhesives, such as non-UV curable acrylic based adhesives. A UV cured adhesive may also perform better than non-UV cured adhesives after exposure to methanol, which is an ingredient in washer fluid. In vehicles, washer fluid may be used to clean the transparent sheet during use. As used herein, UV light may include light having wavelength between 200 and 405 nanometers (nm), inclusive. This includes near UV (NUV) light within the wavelength range of, for example, 385-405 nm. For example only, the UV light used to cure the UV curable pressure sensitive adhesive may have a wavelength of 365 nm or be NUV light within 385-405 nm wavelength range.

Figure 1:
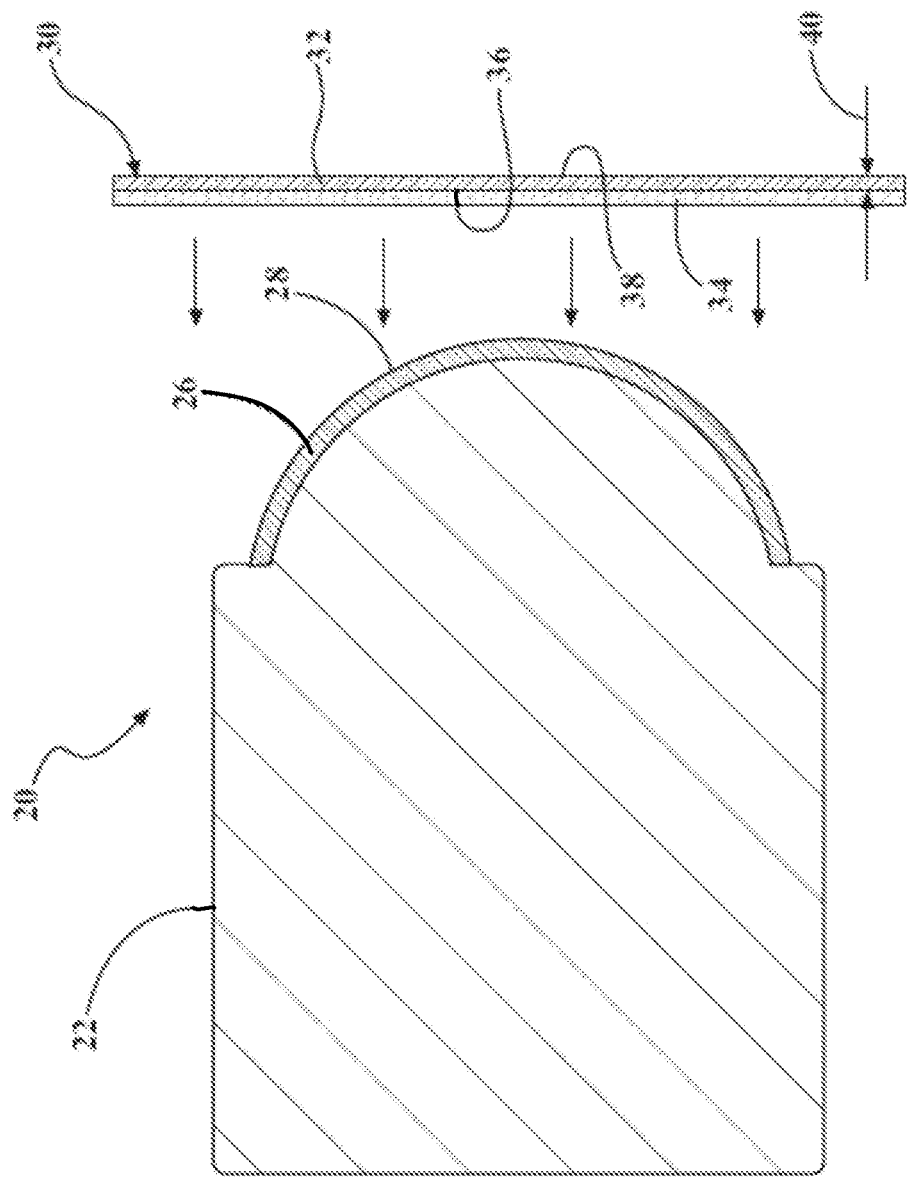
FIG. 1 is a schematic partially exploded cross sectional view of a sensor.
Figure 2:
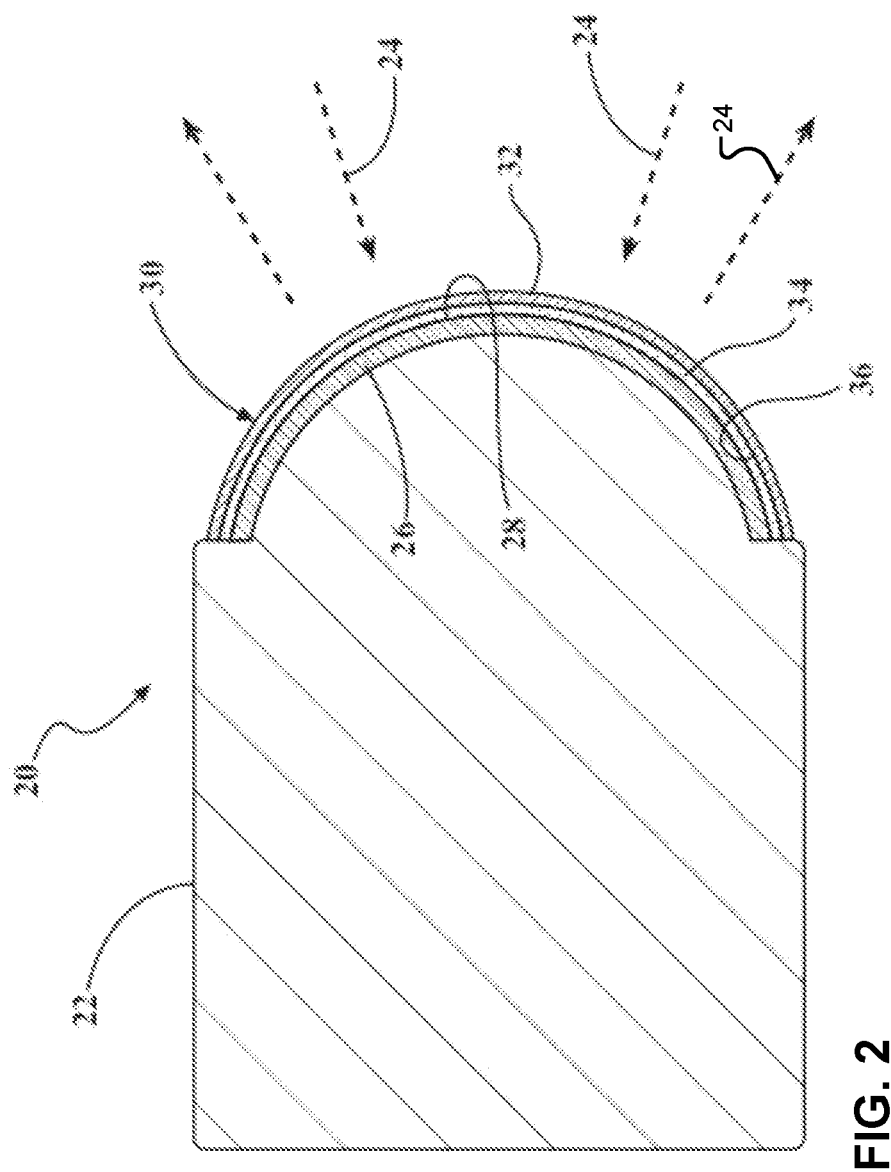
FIG. 2 is a schematic cross sectional view of the sensor, showing an applique positioned over a lens of the sensor.

FIG. 1 includes a partially exploded cross sectional view of a sensor 20 and an applique 30. FIG. 2 includes cross sectional view of the sensor 20 after application of the applique 30.

Referring now to FIGS. 1 and 2, the sensor 20 includes a sensor module 22 that is operable to transmit and/or receive light rays 24 (shown in FIG. 2). The sensor module 22 may be configured, for example, as a range finder, a LIDAR sensor 20, a camera, or another type of sensing device. The sensor module 22 generates output signals based on the received light.

The sensor 20 further includes a clear substrate 26, which is attached to the sensor module 22. As noted above, the sensor module 22 emits and/or receives light rays 24. The light rays 24 pass through the clear substrate 26. The clear substrate 26 may be referred to as a lens, a window, a pane, or a panel. The clear substrate 26 may be configured to concentrate and disperse the light rays 24 as the light rays 24 pass through the clear substrate 26.

The clear substrate 26 includes a first surface 28. The first surface 28 of the clear substrate 26 may be considered an exterior or outer surface of the clear substrate 26. In the examples of FIGS. 1 and 2 and described herein, the first surface 28 of the clear substrate 26 is a nonplanar surface.

For example, the first surface 28 of the clear substrate 26 may include a concave surface or a convex surface, such as shown. However, the first surface 28 of the clear substrate 26 may include a planar surface. The non-planar shape of the first surface 28 of the clear substrate 26 controls the concentration and dispersion of light rays 24 passing through the clear substrate 26.

The clear substrate 26 is made of a transparent material. The clear substrate 26 may include and be manufactured from, but is not limited to, one of a glass material or a plastic material. For example, the clear substrate 26 may include and be manufactured from silica, borosilicate glass, quartz, polycarbonate (e.g., Trivex by PPG™), CR-39 plastic, crown glass, or another suitable transparent material.

The sensor 20 includes the applique 30, which is adhered to the first surface 28 of the clear substrate 26. FIG. 1 shows the applique 30 prior to the applique 30 being adhered to the clear substrate 26. FIG. 2 shows the applique 30 adhered to the clear substrate 26.

Referring to FIGS. 1 and 2, the applique 30 includes a transparent sheet 32, and an ultra violet (UV) curable pressure sensitive adhesive 34. The term "sheet" may refer to a thin piece of a solid material formed into a self-supporting layer. The term "sheet" does not include a layer or film formed from a dried liquid. The applique 30 is adhered to first surface 28 of the clear substrate 26 of the sensor 20 via the pressure sensitive adhesive 34. The applique 30 may be adhered to other types of clear substrates, such as clear substrates of window panels for example.

The transparent sheet 32 includes a first surface 36 and an opposing second surface 38. The first surface 36 of the transparent sheet 32 faces the first surface 28 of the clear substrate 26. The second surface 38 of the transparent sheet 32 is opposite the first surface 36, faces outward, and is exposed to the environment.

As shown in FIG. 1, the transparent sheet 32 includes a thickness 40. The thickness 40 of the transparent sheet 32 may be between 10 and 200 microns. In other examples, the thickness 40 of the transparent sheet 32 may be less than 10 microns or greater than 200 microns.

The transparent sheet 32 may be made of a fluoropolymer. For example, the transparent sheet 32 may be a fluorinated ethylene propylene (FEP) sheet. As other examples, the transparent sheet 32 may be another type of material, such as another fluoropolymer, such as but not limited to Ethylene tetrafluoroethylene (EFTE), Perfluoroalkoxy alkane (PFA), amorphous fluoroplastics (AF), or an alternating copolymer of ethylene and ETFE.

The first surface 36 of the transparent sheet 32 is treated to improve adhesion. More specifically, the first surface 36 of the transparent sheet 32 may be subjected to one or more processes to clean and prepare the first surface 36 to increase surface adhesion. For example, the first surface 36 of the transparent sheet 32 may be treated to improve adhesion using one of an ozone treating process, a corona treating process, a chemical etching process, or a plasma treating process. By treating the first surface 36 of the transparent sheet 32 for adhesion, the pressure sensitive adhesive 34 adheres better to the first surface of the transparent sheet 32 than the first surface 28 of the clear substrate 26 both before and after UV curing. Thus, the applique 30 including both the pressure sensitive adhesive 34 and the transparent sheet 32 can be removed without damaging the first surface 28 of the clear substrate 26 and without the pressure sensitive adhesive 34 remaining on the first surface 28. For example, the applique 30 can be removed and replaced with another one of the appliques 30.

The pressure sensitive adhesive 34 is disposed on the first surface 36 of the transparent sheet 32 after the first surface 36 of the transparent sheet 32 has been treated to improve adhesion. The pressure sensitive adhesive 34 is applied to the first surface 36 of the transparent sheet 32 before being cured (i.e., in not yet UV cured form as a not yet UV cured pressure sensitive adhesive). The pressure sensitive adhesive 34 may be applied to the first surface 36 of the transparent sheet 32, for example, by spraying, doctor blade, rolling, or pressed or in another suitable manner. In various implementations, the pressure sensitive adhesive 34 is provided as a sheet that can be cured to a hardened form via exposure to UV light. The pressure sensitive adhesive 34 is exposed to and cured via UV light to form the UV cured pressure sensitive adhesive 34 on the first surface 36 of the transparent sheet 32.

The pressure sensitive adhesive 34 adheres the transparent sheet 32 to the first surface 28 of the clear substrate 26. The pressure sensitive adhesive 34 includes a distinct category of adhesive materials that in a dry form (e.g., substantially free of both water and solvent) is permanently tacky (after UV curing) at environmental temperatures (e.g., −50 degrees F. to 180 degrees F.) and firmly adheres to a variety of different types of surfaces at environmental temperatures upon contact without the need of more than 20 pounds per square inch of pressure being applied and is curable via UV light. The pressure sensitive adhesive 34 may include a linear or branched, random or blocked, polymer, having one, two, three, or more monomer units. The pressure sensitive adhesive 34 may be a UV curable acrylic adhesive. Examples the pressure sensitive adhesive 34 include OCA 8148-X UV curable adhesive sheet by 3M™ (where X is the thickness, such as 2 mils), 723 UV curable adhesive gel by Dynamax, 723 UV curable adhesive gel by Dynamax and an acrylic PSA binder polymer, U3334 UV adhesive by Cyberbond, 3335 UV curable adhesive by Cyberbond, 73 UV curable adhesive by Norland, 146H UV curable adhesive by Norland, SPF 137 UV curable adhesive by Rahn, SPF 137 UV curable adhesive by Rahn with an acrylic filler (e.g., LA2140e by Kurarity, SPF 255 UV curable adhesive by Rahn, SPF 307 UV curable adhesive by Rahn, UV-5804E UV curable adhesive by EpoxySet, and UV curable adhesive mod 137 by Chemsultants. pressure sensitive adhesive 34 does not form a chemical bond with either the transparent sheet 32 or the clear substrate 26. OCA 8148-X UV curable adhesive sheet by 3M™ may be an acrylic adhesive that is UV curable polymer that is made from acrylic acid, methacrylic acid, or a chemically substituted version of these compounds. As stated above, however, the pressure sensitive adhesive 34 adheres better to the first surface 36 of the transparent sheet 32 than the first surface 28 of the clear substrate 26. Examples of pressure sensitive adhesives 34 can include a material chosen from UV curable adhesives of acrylic resin, polyurethane, rubber, styrene-butadiene-styrene copolymers, ethylene vinyl acetate, styrene block copolymers, polyisobutene (PIB) and silicone, and combinations thereof, such as styrene-ethylene/butylene-styrene (SEBS) block copolymer, styrene-ethylene/propylene (SEP) block copolymer, styrene-isoprene-styrene (SIS) block copolymer, or combinations thereof. The pressure sensitive adhesive 34 can include a pendant UV curable monomer. For example, UV curable acrylic adhesive may include a UV curable monomer pendant off the main chain.

The pressure sensitive adhesive 34 may be a dry adhesive, such as a sheet, or a gel. Once applied to the first surface 36 of the transparent sheet 32 and readied for application onto the first surface 28 of the clear substrate 26, the pressure sensitive adhesive 34 is substantially free of water and solvent. The pressure sensitive adhesive 34 is optically clear both before and after UV curing. For example, the pressure sensitive adhesive 34 may include optically clear UV curable adhesive 8148 from the 3M™ Corporation.

The clear substrate 26 exhibits an index of refraction. The index of refraction of a material is a dimensionless number that describes how light propagates through that material. The pressure sensitive adhesive 34 and the transparent sheet 32 also exhibit a respective index of refraction.

The materials of the clear substrate 26, the pressure sensitive adhesive 34, and the transparent sheet 32 may be selected such that the index of refraction of the transparent sheet 32 is less than the index of refraction of the UV cured pressure sensitive adhesive 34. The index of refraction of the pressure sensitive adhesive 34 is less than the index of refraction of the clear substrate 26. By configuring the transparent sheet 32, the pressure sensitive adhesive 34, and the clear substrate 26 in this manner, i.e., with the index of refraction of the transparent less than the index of refraction of the UV cured pressure sensitive adhesive 34, which is less than the index of refraction of the clear substrate 26, the transparent sheet 32 and the pressure sensitive adhesive 34 act as an anti-reflection layer for the clear substrate 26. This improves light transmission through the clear substrate 26.

Figure 3:
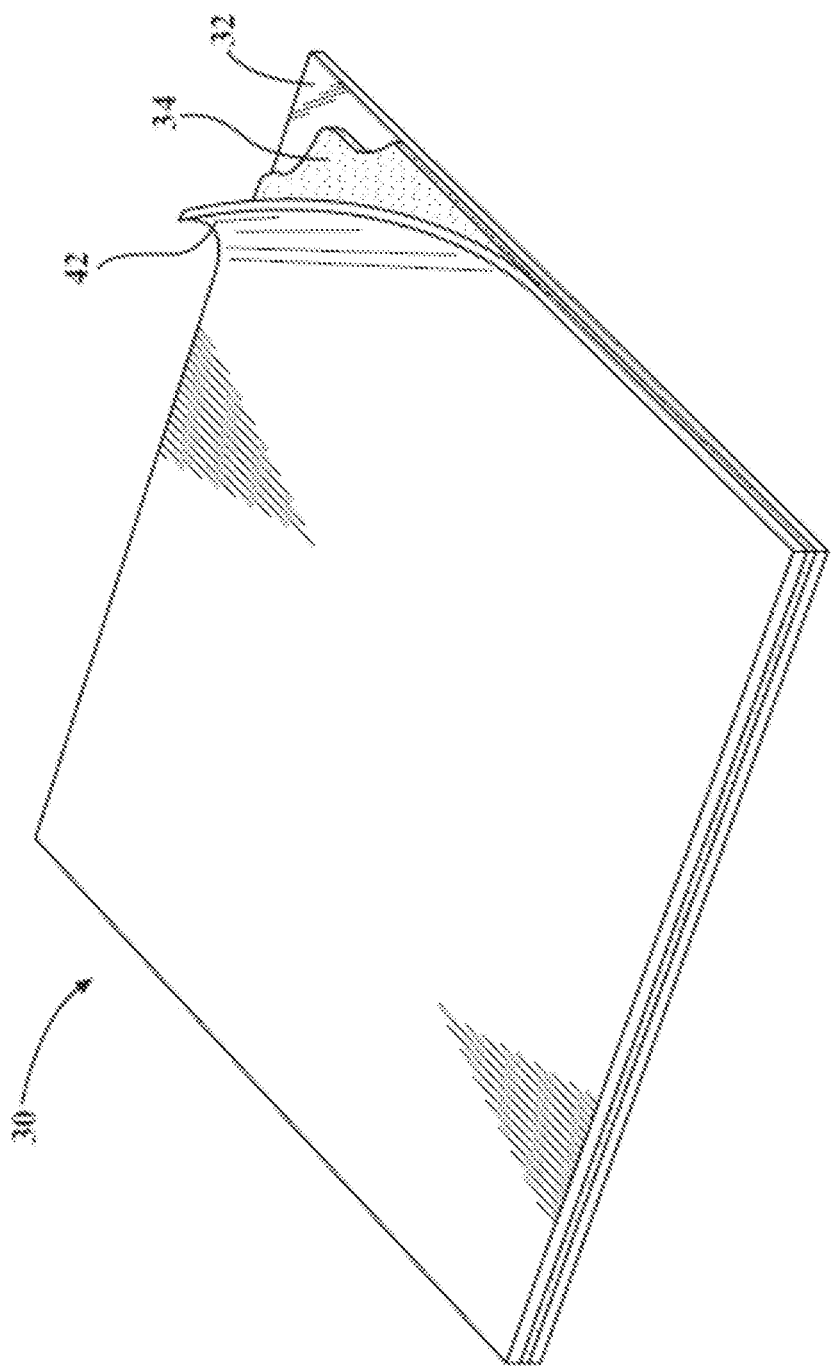
FIG. 3 is a schematic perspective view of the applique showing a release liner partially removed.

FIG. 3 includes a schematic perspective view of the applique 30 with a release liner 42 partially removed. Optionally, if the applique 30 is not going to be applied to the first surface 28 of the clear substrate 26 for a period of time, the release liner 42 may be applied over the UV curable pressure sensitive adhesive 34. The release liner 42 may protect the pressure sensitive adhesive 34 from debris and/or dust until the applique 30 is ready to be applied to the clear substrate 26. The release liner 42 may include a sheet of material that is removable from the pressure sensitive adhesive 34, and that does not damage or disrupt the pressure sensitive adhesive 34 on the first surface 36 of the transparent sheet 32. The pressure sensitive adhesive 34 is more adhered to the first surface 36 of the transparent sheet 32 than to the release liner 42. The release liner 42 may be omitted, for example, if the applique 30 is applied to the clear substrate 26 shortly after the pressure sensitive adhesive 34 has been applied to the clear substrate 26.

Figure 4:
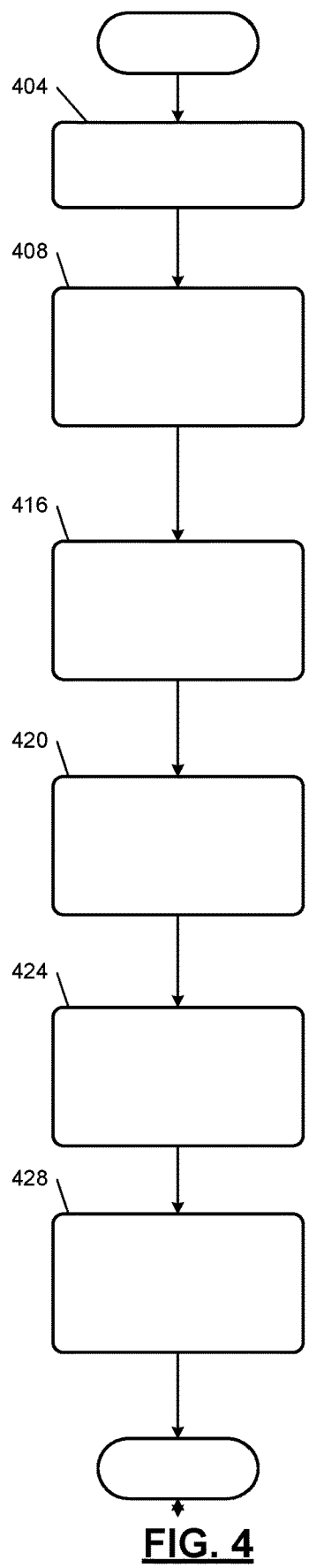
FIG. 4 includes a method of applying the applique to the lens of the sensor and curing an ultra violet (UV) curable pressure sensitive adhesive of the applique.

FIG. 4 includes a flowchart depicting an example method of manufacturing the applique 30 and applying the applique to the sensor 20. At 404, the transparent sheet 32 is obtained. The first surface 36 of the transparent sheet 32 is treated to improve adhesion, as described above. For example, the first surface 36 of the transparent sheet 32 may be subjected to an ozone treating process, a corona treating process, a chemical etching process, a plasma treating process, and/or one or more other suitable adhesion improving processes. The first surface 36 of the transparent sheet 32 is treated for adhesion to improve the adhesion between the pressure sensitive adhesive 34 and the transparent sheet 32.

At 408, the (not yet UV cured) UV curable pressure sensitive adhesive 34 is applied to the first surface 36 of the transparent sheet 32. The manner in which the pressure sensitive adhesive 34 is applied to the first surface 36 of the transparent sheet 32 may depend upon the properties of the pressure sensitive adhesive 34. For example, the pressure sensitive adhesive 34 may be applied as a sheet, or may be applied in a liquid solution, and allowed to dry in order to form a film of the pressure sensitive adhesive 34.

Optionally, at 416 the release liner 42 may be applied over the UV curable pressure sensitive adhesive 34 to protect the pressure sensitive adhesive 34.

Once the applique 30 has been prepared, the applique 30 can be applied to the first surface 28 of the clear substrate 26. If the applique 30 was prepared with the release liner 42, the release liner 42 is peeled off to expose the pressure sensitive adhesive 34 at 420 prior to application of the applique 30 to the first surface 28 of the clear substrate 26. The transparent sheet 32 is adhered to the first surface 28 of the clear substrate 26, such as shown in FIG. 2, with the pressure sensitive adhesive 34 contacting the first surface 28 of the clear substrate 26.

Depending upon the specific characteristics of the UV curable pressure sensitive adhesive 34, a liquid, such as water, may be applied to the first surface 28 of the clear substrate 26 prior to the application of the applique 30 to the first surface 28 of the clear substrate 26. The liquid may allow the transparent sheet 32 to be shifted into a proper position and/or allow any air bubbles and wrinkles in the transparent sheet 32 to be worked out from between the clear substrate 26 and the transparent sheet 32. Once the transparent sheet 32 is properly positioned on the clear substrate 26, sufficient pressure is applied to the transparent sheet 32 at 424 to create the adhesion between the pressure sensitive adhesive 34 and the first surface 28 of the clear substrate 26.

At 428, the UV curable pressure sensitive adhesive 34 is cured by exposing the UV curable pressure sensitive adhesive 34 to a UV light source, such as a light source including one or more UV light bulbs, one or more UV emitting light emitting diodes (LEDs), or another suitable source of UV light. The UV light may include light having wavelength between 200 and 405 nanometers (nm), inclusive. This includes near UV (NUV) light within the wavelength range of, for example, 385-405 nm. For example only, the UV light used to cure the UV curable pressure sensitive adhesive may have a wavelength of 365 nm or be NUV light within 385-405 nm wavelength range. The exposure of the (not yet cured) UV curable pressure sensitive adhesive 34 cures the UV curable pressure sensitive adhesive 34 and forms the UV cured pressure sensitive adhesive 34. Once applied to the clear substrate 26 and UV cured, the transparent sheet 32 may exhibit a peel strength of between 0.5 and 3.0 pounds per inch.

Via the above, the transparent sheet 32 may be easily removed from the clear substrate 26 (e.g., at regular maintenance intervals) and a new one of the appliques 30 can be applied. This may maintain a clear, clean, protective surface over the clear substrate 26. The transparent sheet 32 of the applique 30, e.g., fluorinated ethylene propylene, in combination with the UV cured pressure sensitive adhesive 34, provides good light transmission through the clear substrate 26, does not degrade in response to UV exposure, maintains proper adhesion even when exposed to lens cleaning solvents such as window washer fluid (e.g., including methanol), and easily sheds dirt and other debris to keep the clear substrate 26 clean and protected.

Testing was conducted on examples described above. Fluorinated ethylene propylene (FEP) appliques were fabricated with a range of pressure sensitive adhesives (PSA) to provide a removable anti-soiling solution for sensors. Optical transparency, peel strength, UV exposure, methanol resistance, camera resolution, and LIDAR attenuation were tested. FEP appliques using UV cured adhesive 8148 from the 3M™ Corporation, optical grade, outdoor rated PSA performed suitably for all measurements. These appliques improved the light transmission on substrates due to their lower index of refraction compared to silica and lost 2-6% of light on polycarbonate lenses. For example, silica may have an n value of 1.5, while the pressure sensitive adhesive may have an n value of 1/47, and the clear substrate (e.g., FEP) has an n value of 1.34. Appliques of FEP on UV cured adhesive 8148 from the 3M™ Corporation maintained a 2±0.5 lb/in peel strength from 20° F. to 120° F. demonstrating they were removable but would not fall off from temperature variations. After a 3 month equivalent UV exposure, the applique transmission decreased by a negligible 0.5% and there was no change in anti-fouling results. FEP on UV cured adhesive 8148 from the 3M™ Corporation did not de-bond off glass after 7 days soak in methanol or lose transparency, which indicates that these appliques will not be removed or degraded by sensor fluidic wash systems.

The following Table 1 illustrates performances of different types of adhesives relative to the clear substrate 26 (Polycarbonate) for 940 nanometer (nm) wavelength light (used by LIDAR sensors).

TABLE 1

| Sample angle v | Poly-carbonate | | Applique made with 5 mil FEP on mod 137 adhesive | | Applique made with 5 mil FEP on 3M 8148 adhesive after UV curing | | Applique made with 5 mil FEP on 3M 8172 adhesive | |
|---|---|---|---|---|---|---|---|---|
| incident light | Strehl ratio | RMS (λ) | Strehl ratio | RMS (λ) | Strehl ratio | RMS (λ) | Strehl ratio | RMS (λ) |
| 0° | .96 | 0.031 | .81 | 0.072 | .95 | 0.034 | .76 | 0.086 |
| 10° | .97 | 0.027 | .66 | 0.120 | .96 | 0.033 | .75 | 0.088 |
| 20° | .95 | 0.029 | .64 | 0.125 | .96 | 0.034 | .73 | 0.092 |
| 30° | .95 | 0.036 | .59 | 0.133 | .95 | 0.034 | .67 | 0.102 |
| 45° | .83 | 0.069 | .44 | 0.157 | .95 | 0.035 | .48 | 0.133 |

Table 1 compares the Strehl ratios and errors (RMS (A)) of the clear substrate 26 (without the transparent sheet 32 and without adhesive) relative to the inclusion of UV curable adhesive mod 137 by Chemsultants, OCA 8148-2 UV curable adhesive sheet by 3M™, and acrylic based (non-UV curable) 8172 adhesive sheet by 3M™ and the transparent sheet 32. As illustrated by Table 1, OCA 8148-2 UV curable adhesive sheet by 3M™ performed better than UV curable adhesive mod 137 by Chemsultants and acrylic based (non-UV curable) 8172 adhesive sheet by 3M™ in terms of Strehl Ratio and error. The OCA 8148-2 UV curable adhesive sheet by 3M™ performed closely to the clear substrate 26 alone and performed better than the clear substrate 26 alone in terms of Strehl ratio and error at a sample angle versus incident light of 45°.

The following Table 2 illustrates performances of different types of adhesives relative to the clear substrate 26 (Polycarbonate) for 1550 nm wavelength light (used by LI DAR sensors).

TABLE 2

| Sample angle v | Poly-carbonate | | Applique made with 5 mil FEP on mod 137 adhesive | | Applique made with 5 mil FEP on 3M 8148 adhesive after curing | | Applique made with 5 mil FEP on 3M 8172 adhesive | |
|---|---|---|---|---|---|---|---|---|
| incident light | Strehl ratio | RMS (λ) | Strehl ratio | RMS (λ) | Strehl ratio | RMS (λ) | Strehl ratio | RMS (λ) |
| 0° | .96 | 0.033 | .80 | 0.083 | .91 | 0.051 | .80 | 0.079 |
| 10° | .94 | 0.039 | .77 | 0.090 | .94 | 0.042 | .82 | 0.072 |
| 20° | .93 | 0.041 | .75 | 0.092 | .92 | 0.046 | .81 | 0.077 |
| 30° | .91 | 0.048 | .65 | 0.112 | .92 | 0.047 | .71 | 0.098 |
| 45° | .78 | 0.082 | .34 | 0.176 | .90 | 0.055 | .61 | 0.147 |

Table 2 compares the Strehl ratios and errors (RMS (A)) of the clear substrate 26 (without the transparent sheet 32 and without adhesive) relative to the inclusion of UV curable adhesive mod 137 by Chemsultants, OCA 8148-2 UV curable adhesive sheet by 3M™, and acrylic based (non-UV curable) 8172 adhesive sheet by 3M™ and the transparent sheet 32. As illustrated by Table 2, OCA 8148-2 UV curable adhesive sheet by 3M™ performed better than UV curable adhesive mod 137 by Chemsultants and acrylic based (non-UV curable) 8172 adhesive sheet by 3M™ in terms of Strehl Ratio and error. The OCA 8148-2 UV curable adhesive sheet by 3M™ performed closely to the clear substrate 26 alone and performed better than the clear substrate 26 alone in terms of Strehl ratio and error at a sample angle versus incident light of 45°.

The following Table 3 illustrates performances of different types of adhesives with the transparent sheet 32 for 1550 nm wavelength light (used by LIDAR sensors) with 0° incident light before and after menthol exposure.

TABLE 3

| 0° incident light, | Applique made with 5 mil FEP on mod 137 adhesive | | Applique made with 5 mil FEP on 3M 8148 adhesive after curing | | Applique made with 5 mil FEP on 3M 8172 adhesive | |
|---|---|---|---|---|---|---|
| 1550 nm wavelength | Strehl ratio | RMS ($\lambda$) | Strehl ratio | RMS ($\lambda$) | Strehl ratio | RMS ($\lambda$) |
| Before methanol exposure | .80 | 0.083 | .91 | 0.051 | .80 | 0.079 |
| After methanol exposure | .51 | 0.172 | .91 | 0.050 | .53 | 0.129 |

Table 3 compares the Strehl ratios and errors (RMS (A)) before and after exposure to methanol of UV curable adhesive mod 137 by Chemsultants, OCA 8148-2 UV curable adhesive sheet by 3M™, and acrylic based (non-UV curable) 8172 adhesive sheet by 3M™ and the transparent sheet 32. As illustrated by Table 3, OCA 8148-2 UV curable adhesive sheet by 3M™ suitably resisted degradation due to the exposure to methanol.

Figure 5:
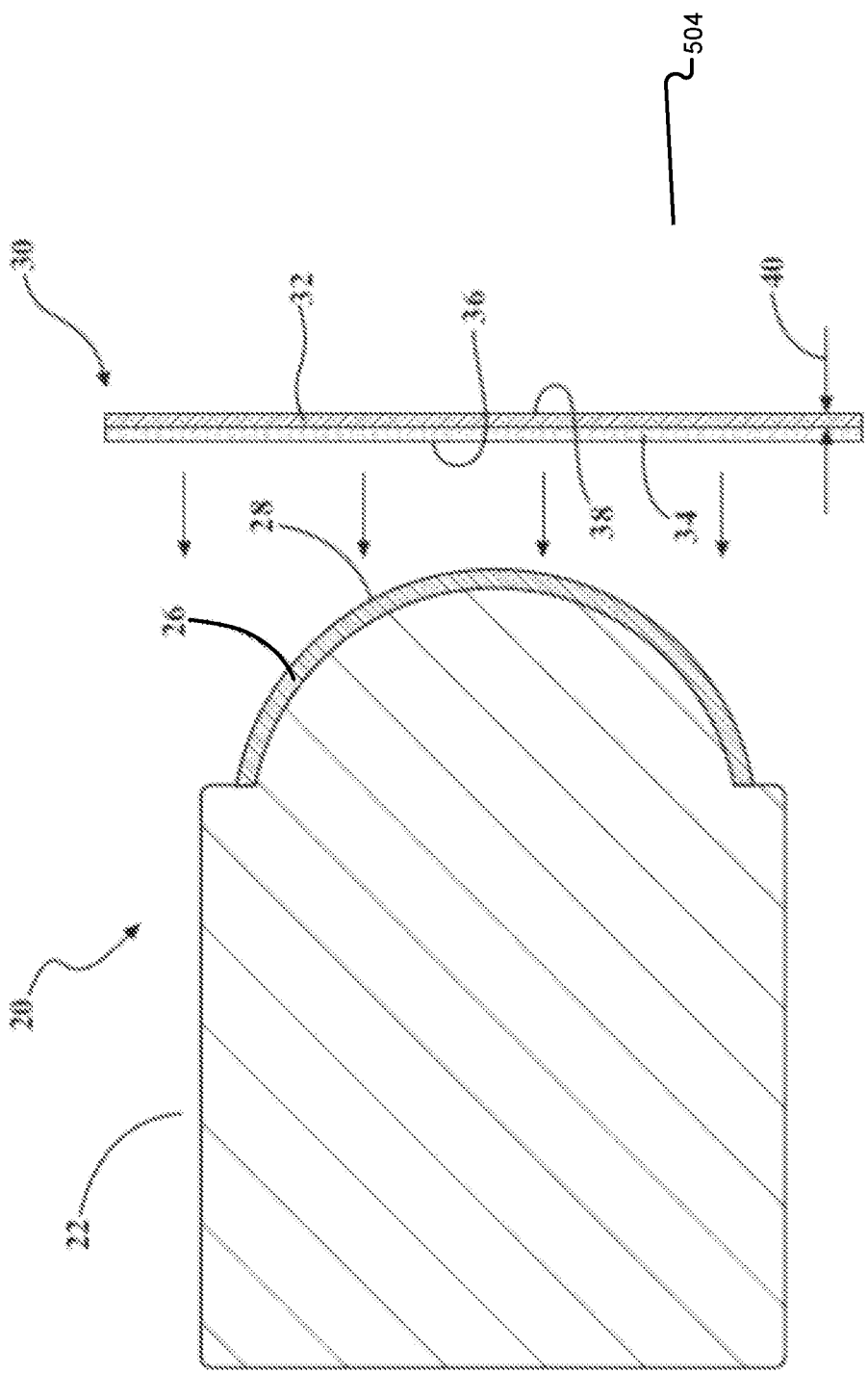
FIG. 5 includes a schematic partially exploded cross sectional view of a sensor with an applique including a coating.

FIG. 5 includes a partially exploded cross sectional view of the sensor 20 and the applique 30. In the example of FIG. 5, the applique 30 also includes a coating 504 on the second surface 38 of the transparent sheet 32. The coating 504 may include an anti-icing coating. Examples of anti-icing coatings include a phase separated fluorinated and hygroscopic polymer and a fluorinated and hydrophilic polymer. The coating 504 may additionally or alternatively include an anti-fouling coating. Examples of anti-fouling coatings include a phase separated fluorinated and hydrophilic polymer, a fluorinated and hydrophobic polymer, and a fluorinated and amphiphilic polymer.

The coating 504 may additionally or alternatively include an anti-scratch coating. Examples of anti-scratch coatings include hard coatings, such as a ceramic coating (e.g., alumina or sapphire), a diamond like carbon, a nitride (e.g., silicon nitride or aluminum nitride), and a silica-based glass.

The coating 504 may additionally or alternatively include an anti-reflective coating. Examples of anti-reflective coatings include magnesium fluoride, calcium fluoride, sodium fluoride, porous silica, or a multi-layered interference coating including alternating layers of a low-index material (e.g., silica) and a higher index material.

The coating 504 may additionally or alternatively include a tint coating. Examples of tint coatings include an additive that could be a film/coating. Alternatively, the tint can be a powder incorporated into the transparent sheet 32. The tint absorbs light to protect the sensor module 22 and/or the clear substrate 26. For example, the tint may absorb visible and UV light but pass near-IR (NIR) light.

The coating 504 may additionally or alternatively include a reflective coating. Examples of reflective coatings include a metallic layer that partially or totally absorbs light or a multi-layer interference coating that scatters specific wavelengths of light.

The coating 504 may additionally or alternatively include a hydrophilic coating. Examples of hydrophilic coatings include one or more layer with charged groups, such as ammonium cations or sulfate anions. The layer(s) can be polymer layers or layers made from alkyl silanes.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) or light that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

What is claimed is:

1. A system comprising:
   a light detection and ranging (LIDAR) sensor including a lens through which light is transmitted and received, the lens having an outer surface; and
   an applique that is adhered to the outer surface of the lens, the applique comprising:
   a transparent sheet having:
   a first surface; and
   a second surface that is opposite the first surface; and
   a ultraviolet (UV) curable pressure sensitive adhesive that is disposed on the first surface of the transparent sheet, that is curable using UV light, and that is configured to adhere the transparent sheet to the outer surface of the lens,
   wherein, prior to application of the UV curable pressure sensitive adhesive to the transparent sheet, the first surface of the transparent sheet is treated by an ozone treatment process,
   wherein the lens exhibits a first index of refraction;
   wherein the UV curable pressure sensitive adhesive exhibits a second index of refraction after being UV cured;
   wherein the transparent sheet exhibits a third index of refraction;
   wherein the third index of refraction of the transparent sheet is less than the second index of refraction of the UV curable pressure sensitive adhesive; and
   wherein the second index of refraction of the UV curable pressure sensitive adhesive is less than the first index of refraction of the lens.

2. The system of claim 1 wherein a thickness of the UV curable pressure sensitive adhesive is 2 mils.

3. The system of claim 1 wherein the transparent sheet is a fluoropolymer sheet.

4. The system of claim 1 wherein the transparent sheet is fluorinated ethylene propylene.

5. The system of claim 1 wherein the UV curable pressure sensitive adhesive is a dry adhesive.

6. The system of claim 1 wherein the UV curable pressure sensitive adhesive includes a sheet of UV curable adhesive that is cured using the UV light after application of the applique to the lens.

7. The system of claim 1 wherein the UV curable pressure sensitive adhesive is configured to adhere better to the first surface of the transparent sheet than to the outer surface of the lens.

8. The system of claim 1, wherein the outer surface of the lens is a planar surface.

9. The system of claim 1, wherein the outer surface of the lens is a convex surface.

10. The system of claim 1 further comprising a release liner that covers the UV curable pressure sensitive adhesive prior to the application of the applique to the lens and that is removed prior to the application of the applique to the lens.

11. The system of claim 10 wherein the UV curable pressure sensitive adhesive is configured to adhere better to the first surface of the transparent sheet than to the release liner.

12. The system of claim 1 further comprising a coating on the second surface of the transparent sheet.

13. The system of claim 12 wherein the coating includes at least one of:
   an anti-icing coating;
   an anti fouling coating;
   an anti-scratch coating;
   an anti-reflective coating;
   a tint;
   a reflective coating; and
   a hydrophilic coating.

14. A sensor comprising:
   a clear substrate having a first surface;
   a light detection and ranging (LIDAR) sensor module configured to receive light through the clear substrate; and
   an applique that is adhered to the first surface of the clear substrate and that includes:
   a transparent sheet having:

a second surface; and
a third surface that is opposite the second surface; and
a ultraviolet (UV) cured pressure sensitive adhesive that is sandwiched between the second surface of the transparent sheet and the first surface of the clear substrate and that adheres the transparent sheet to the clear substrate;
wherein a lens of the LIDAR sensor module exhibits a first index of refraction;
wherein the UV cured pressure sensitive adhesive exhibits a second index of refraction;
wherein the transparent sheet exhibits a third index of refraction;
wherein the third index of refraction of the transparent sheet is less than the second index of refraction of the UV cured pressure sensitive adhesive; and
wherein the second index of refraction of the UV cured pressure sensitive adhesive is less than the first index of refraction of the lens.

15. The sensor of claim 14 wherein the sensor module is further configured to transmit light through the clear substrate.

16. The sensor of claim 14 wherein:
the transparent sheet is fluorinated ethylene propylene.

17. The sensor of claim 14 wherein the applique further includes, on the third surface of the transparent sheet, at least one of:
an anti-icing coating;
an anti fouling coating;
an anti-scratch coating;
an anti-reflective coating;
a tint;
a reflective coating; and
a hydrophilic coating.

18. The sensor of claim 14 further comprising a release liner that covers the UV cured pressure sensitive adhesive prior to the application of the applique to the LIDAR sensor module and that is removed prior to the application of the applique to the LIDAR sensor module.

* * * * *